United States Patent
Miller et al.

[15] 3,678,114
[45] July 18, 1972

[54] PROCESS FOR THE PREPARATION OF TRIAMINOBENZENE

[72] Inventors: John Miller, Mapperley; Martin Searle, Loughborough, both of England

[73] Assignee: Fisons Limited, Felixstowe, Suffolk, England

[22] Filed: Feb. 3, 1970

[21] Appl. No.: 8,430

[30] Foreign Application Priority Data

Feb. 18, 1969 Great Britain..................8,821/69

[52] U.S. Cl. .................................................. 260/580
[51] Int. Cl. ................................................ C07c 85/10
[58] Field of Search ..................................... 260/580

[56] References Cited

FOREIGN PATENTS OR APPLICATIONS 1,022,733   3/1966   Great Britain..................260/580

Primary Examiner—Joseph Rebold
Assistant Examiner—Donald M. Papuga
Attorney—Wenderoth, Lind & Ponack

[57] ABSTRACT

Triaminobenzene is prepared by the hydrogenation of an aqueous solution of an alkali metal or ammonium salt of trinitrobenzoic acid. The reaction is carried out in the presence of a noble metal catalyst, and the product is suitable for conversion in situ to phloroglucinol.

10 Claims, No Drawings

PROCESS FOR THE PREPARATION OF TRIAMINOBENZENE

The present invention relates to a new and improved method of preparation of triaminobenzene.

Triaminobenzene is an important intermediate in the preparation of phloroglucinol to which it is converted by hydrolysis.

It has been proposed to prepare triaminobenzene by the catalytic hydrogenation of trinitrobenzene in an organic solvent. Attempts to extend this process to the hydrogenation of trinitrobenzoic acid, a more readily available starting material, have not proved entirely satisfactory, since it is difficult to obtain complete reaction and the choice of solvents is restricted since solvolysis can occur under the reaction conditions, particularly with alcohols. Non-reactive solvents, e.g., ethyl acetate, are expensive and render the process uneconomic unless special precautions are taken to ensure high recoveries. Hydrogenation of trinitrobenzoic acid does not work well and in any case is not a practical proposition because of its very low solubility.

It has now surprisingly been found that an alkali metal salt of trinitrobenzoic acid can be quantitatively hydrogenated, with simultaneous decarboxylation, to form triaminobenzene. This process is particularly advantageous in that it is carried out in an aqueous medium without the necessity of organic solvents, and does not require a separate preliminary decarboxylation step.

Accordingly, the present invention provides a process for the preparation of triaminobenzene which comprises hydrogenating a solution of an alkali metal or ammonium salt of trimitrobenzoic acid in an aqueous medium in the presence of a noble metal catalyst. The alkali metal salt is preferably the sodium salt.

The noble metal preferably comprises palladium or platinum and is preferably carried on an inert support. Particularly suitable is a catalyst comprising 5 percent palladium on a charcoal support. The amount of catalyst used may be varied over a wide range but an amount equivalent to 0.5–4 (preferably 0.5–3)g of noble metal per mole of trinitrobenzoic acid salt has been found suitable for most purposes.

The reaction may be carried out at temperatures from ambient up to the boiling point of the solution of the reactants, but is preferably carried out at 50° – 80° C. It is advantageous to carry the reaction out at about 70° C. since at this temperature the solubility is such that a concentration of product particularly suitable for direct hydrolysis to phloroglucinol is produced.

The pressure at which the hydrogenation is carried out is not critical but is suitably 40 – 80 psig, and preferably about 55 – 65 psig.

A particular advantage of the process according to the present invention is that the purity of the trinitrobenzoic acid used is not critical. Excellent results have been achieved using the crude damp product, containing up to 30 percent water, obtained directly by the oxidation of trinitrotoluene. The trinitrobenzoic acid may be converted in situ to the alkali metal or ammonium salt by suspending it in water and adding an alkali metal or ammonium hydroxide, carbonate or bicarbonate; sodium bicarbonate being particularly preferred. It has been found preferable not to completely neutralize the trinitrobenzoic acid but to leave up to about 15 percent, suitably about 10 percent, as the free acid. The solution of the alkali metal salt of trinitrobenzoic acid thus produced may be used directly for the hydrogenation.

The aqueous medium may contain at least one organic solvent miscible with water, for example lower ketones such as acetone, and lower alcohols such as methanol, if desired, but this is not necessary. Preferably the aqueous solution to be hydrogenated contains up to 10 percent by weight, suitably 4 to 6 percent by weight, of acetone and/or methanol. The reactant mixture is preferably stirred or otherwise agitated during the hydrogenation to ensure intimate contact between the three phases.

After completion of the reaction, the catalyst may be removed by filtration or by other means, and the triaminobenzene may be recovered by precipitation if desired. In general, however, the triaminobenzene is not isolated but is hydrolysed, in situ, in any convenient manner to phloroglucinol, for example by adding acid, preferably hydrochloric acid, to the filtrate and refluxing.

The following Examples are given by way of illustration only.

EXAMPLE 1

10 g trinitrobenzoic acid was suspended in 30 ml water in a hydrogenator, and the stoichiometric amount of sodium bicarbonate was gradually added thereto with stirring until frothing (due to evolution of $CO_2$) ceased, 2 g of catalyst comprising 5 percent palladium on charcoal was added and hydrogenation carried out at 70° C. and at a pressure of 60 psig. Quantitative uptake of hydrogen occurred after 1–1.5 hours.

The solution was removed from the hydrogenator and filtered to remove the catalyst. The filtrate was separated into two portions. The triaminobenzene in the first portion was precipitated and identified by comparison with an authentic sample. The other portion of the filtrate was acidified with hydrochloric acid and refluxed for 20 hours. Phloroglucinol in high yield was recovered by concentration and crystallization of this refluxed mixture.

EXAMPLE 2

10 g trinitrobenzoic acid was suspended in 30 ml water in a hydrogenator, and sodium bicarbonate, in amount equal to 90 percent of the stoichiometric amount, was gradually added thereto with stirring until frothing (due to evolution of $CO_2$) ceased. 2 ml of acetone and 0.6 g of catalyst comprising 5 percent palladium on charcoal were added, and hydrogenation carried out at 70° C. and at a pressure of 60 psig. Quantitative uptake of hydrogen occurred after 45 to 50 minutes.

The triaminobenzene was separated in good yield as in Example 1.

We claim:

1. A process for the preparation of triaminobenzene which comprises hydrogenating a solution of a salt selected from alkali metal and ammonium salts of trinitrobenzoic acid in an aqueous medium in the presence of a catalyst comprising a noble metal selected from palladium and platinum and at a temperature between ambient temperature and the boiling point of the reaction medium.

2. A process as claimed in claim 1 wherein the sodium salt of trinitrobenzoic acid is used.

3. A process as claimed in claim 1 wherein the noble metal catalyst is carried on an inert support.

4. A process as claimed in claim 1 in which the catalyst comprises 5 percent palladium on a charcoal support.

5. A process as claimed in claim 1 wherein the reaction is carried out at 50° – 80° C.

6. A process as claimed in claim 1 wherein the hydrogenation is carried out at a pressure of 40 – 80 pounds per square inch gauge.

7. A process as claimed in claim 1 wherein the salt of the trinitrobenzoic acid is formed in situ by the addition of a base selected from alkali metal and ammonium hydroxides, carbonates and bicarbonates to a suspension of trinitrobenzoic acid in water.

8. A process as claimed in claim 7 wherein the alkali metal bicarbonate is sodium bicarbonate.

9. A process as claimed in claim 7 wherein up to 15 percent of the trinitrobenzoic acid is retained as the free acid.

10. A process as claimed in claim 1 wherein the solution contains up to 10 percent by weight of a solvent selected from acetone and methanol.

* * * * *